United States Patent [19]

Strandberg

[11] Patent Number: 4,798,475

[45] Date of Patent: Jan. 17, 1989

[54] DEVICE FOR PROVIDING LIME TO ACIDULATED WATERS

[75] Inventor: Anders Strandberg, Boxholm, Sweden

[73] Assignee: Boxholmkonsult AB, Boxholm, Sweden

[21] Appl. No.: 935,436

[22] Filed: Nov. 26, 1986

[30] Foreign Application Priority Data

Nov. 26, 1985 [SE] Sweden ............................. 8505584-6

[51] Int. Cl.⁴ .......................... B01F 5/06; B01F 15/02
[52] U.S. Cl. ..................................... 366/160; 366/18; 366/162; 366/182; 366/336; 138/42
[58] Field of Search ............................... 366/336–340, 366/18, 30, 160, 162, 182, 185, 186, 76, 349; 138/40, 42

[56] References Cited

FOREIGN PATENT DOCUMENTS 629781 4/1936 Fed. Rep. of Germany .
15023 8/1901 Sweden .
7904599-3 5/1979 Sweden .

*Primary Examiner*—Timothy F. Simone
*Attorney, Agent, or Firm*—Cushman, Darby & Cushman

[57] ABSTRACT

A device for adding lime to acidulated flowing water including a feed hopper and an endless belt conveyor arranged below the feed hopper. The belt conveyor is driven via a one-way clutch of an arm that is, in turn, driven by a tilting movement of a vessel. The vessel is so journaled that when it has been filled with water to a certain level, it tilts forward, allowing the water to stream out of the vessel. At each tilting movement, a chain coupled to the arm drives the conveyor a distinct stretch forward. When the water has left the vessel, a counterweight makes it tilt upwards again, to be filled again. The water is delivered from the stream in proportion to the flow in the stream, for instance by means of a chute starting in a defined cross-section of the stream. The water from the tilting vessel is lead to a solution chamber wherein baffles extending down from above and up from the bottom force the water to stream turbulently upwards and downwards on each tilting of the vessel, securing good solution of the lime before, the line is allowed to leave the solution chamber, together with the water that is led into the stream downstream of the inlet to the chute.

6 Claims, 3 Drawing Sheets

DEVICE FOR PROVIDING LIME TO ACIDULATED WATERS

BACKGROUND OF THE INVENTION

In order to retard the acidification of the water of lakes, streams and similar bodies that is a consequence of acid rain and snow that is in turn caused by the burning of sulfur containing fuels, it is well known to add lime to the water in different ways. This lime is presently conventionally added in several different ways that are more or less efficient. For instance, it has been discovered that the lime, in order to be dissolved in the water, and thereby neutralizing the acid, must be added to the work as particles having a very small particle size, since the particles otherwise receive a coating preventing further solvation. The lime thus has its greatest effect if it is spread or added to the water in the form of lime flour. Regretfully, there have been no satisfactory methods or devices for continuously adding lime flour to a water stream. Instead, the adding of lime has been accomplished by incremental additions made from time to time, with consequent great variations in ph-value. This is not only undesirable from a biological viewpoint but has also meant that the added lime has not been used to its full extent.

SUMMARY OF THE INVENTION

In order to enable an optimum use of the lime it is preferable that the lime addition be continuous and that it be governed by the amount of rain or snow which is falling in the region, since it is the acid in the rain or snow that contributes the acidity to the body of water.

This problem is in accordance with the invention solved by providing a vessel to which is led a smaller or greater part of the water in the stream, the center of the gravity of the water volume of the vessel being eccentric relative to a turning axle of the vessel, the vessel in itself being counterbalanced so that when no water is present in the vessel the vessel is horizontal, whereas when a certain volume of water becomes contained in the vessel, the vessel tilts. The tilting motion of the vessel drives a lime feeder. From the vessel, the water is delivered to a solution chamber where water and lime are forced under and over a plurality of baffles so that the lime particles are repeatedly subjected to turbulent movement due to the pulse-like delivery of water to the chamber. The baffles also prevent undissolved particles from leaving the chamber since particles of a certain size will be trapped in the chamber until they are so reduced by solvation and against abrasion against each other and the baffles that they have become substantially completely dissolved.

The lime can be added directly to the solution chamber or more preferably to the tilting vessel itself.

The above solution according to the invention can easily be used where a smaller or greater part of a stream can be tapped directly. By tapping off a certain part of the total width of the stream, the amount of water led to the lime-adding device will be proportional to the total amount of water streaming and the device is thus responsive very quickly to changes in water flow. When there are great amounts of water due to heavy rains and thus a heavy acidulation, more lime is added. This action is automatic and, due to the simple principle of the device, very reliable.

In order to allow the use of the invention also in streams which flow very slowly and consequently are very level, the invention provides in accordance with a further development a pump device constituted by a pump chamber arranged with its volume at least partly within the water level zone of the water surface, which pump chamber is provided with an inlet having a non-return valve and an exit flowing water strokewise is pressed out into the pump chamber through the outlet by suitable means and into the tilting vessel. Between pump strokes water flows into the pump chamber to a degree that varies with the water level of the stream, thus still retaining the proportionality of lime addition provided by use of the device. Preferably, the means for pressing out the water from the pump chamber is constituted by compressed air, provided in pulses. This can, for instance, be obtained by an air pump in the shape of a reciprocating piston or membrane with a great volume or by means of regulating pulses from some other source of compressed air.

Further features and advantages of the invention will be apparent from the following description of two preferred embodiments also shown in the drawings.

DETAILED DESCRIPTION

Figure 1:
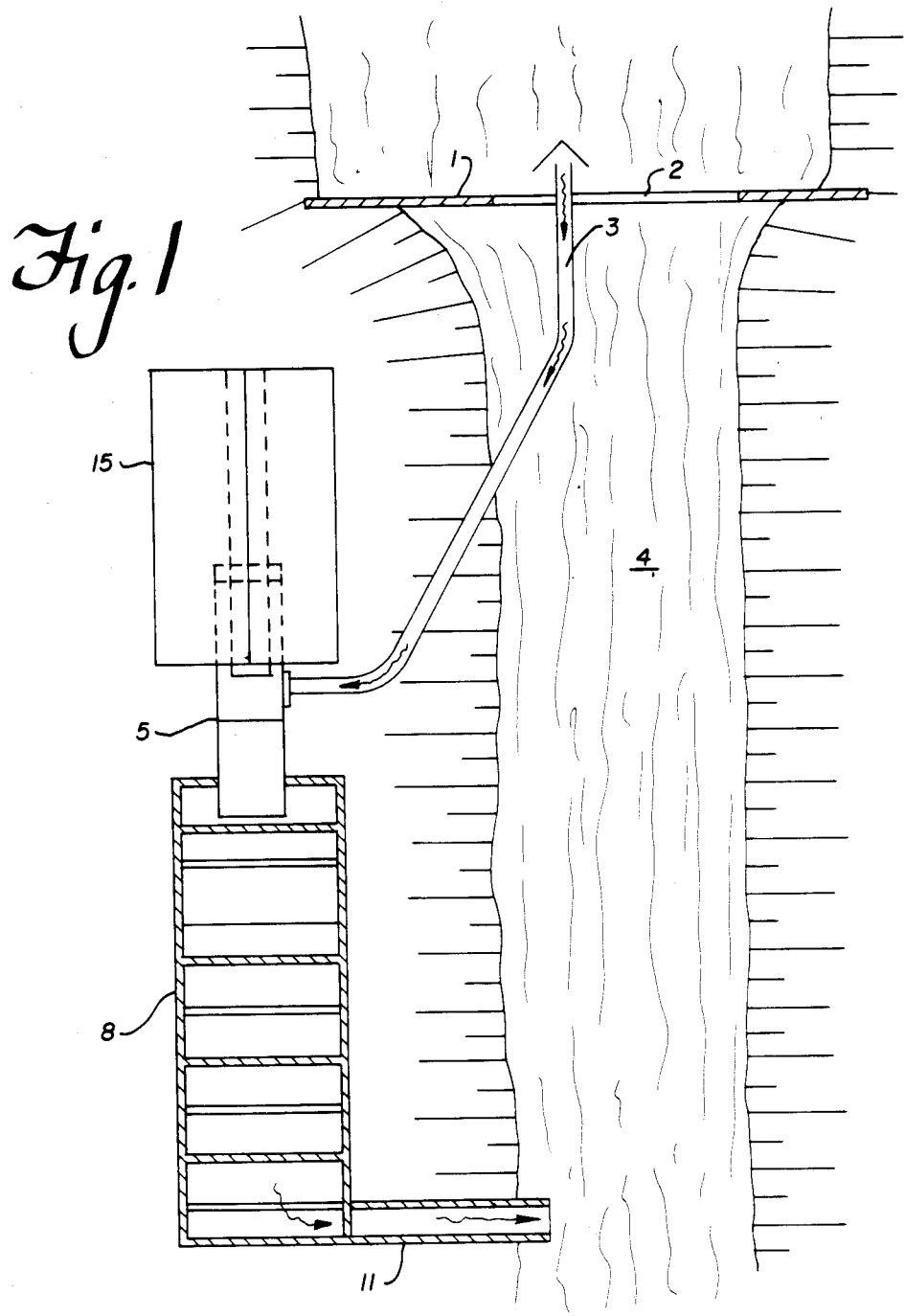
FIG. 1 is a diagrammatic top plan view of a stream provided with a device for continuously adding lime to the water in proportion to water flow, according to a first embodiment of the present invention.

In FIG. 1 is shown how the device of the first embodiment of the invention is placed close to a small dam. The dam 1 has an overflow 2 a part of which is covered by a chute 3 so that, always, an amount of the stream proportional to the width of the chute 3 is led into the chute and delivered to the device. This water then reenters the stream below the dam. The chute 3 has an outlet above the tiltable vessel 5. The vessel is excentrically journaled at 6 and provided with a counterbalance 7, keeping the tilting vessel level when there is no or little water in it.

The water streaming through the chute 3 will gradually fill the tilting vessel 5 until it tilts. When it tilts forward, the water streams from the tilting vessel 5 into a solution chamber, 8. In this solution chamber baffles are arranged extending from the top as well as from the bottom. The baffles extending from the top have been designated the reference numeral 9 and the ones extending upwards from the bottom have been designated 10. Finally, the water leaves the solution chamber by an outlet 11 to reenter the stream 4.

When the tilting vessel 5 tilts, a chain 12 conveys the tilting motion to an arm 13 that in turn turns an axle of and endless belt conveyor 14 via a one-way coupling. The belt conveyor is arranged below a hopper 15 filled with lime powder. The hopper 15 is provided with bottom outlets so that, upon on each tilting of the tilting vessel 5, the conveyor conveys a certain amount of lime to the tilting vessel. In this way the lime is added when the water is in motion and a very equal distribution of the lime is achieved.

The forward tilting movement of the tilting vessel 5 is stopped by the counter weight coming in contact with an essentially horizontal bar below the feed hopper 15. The horizontal bar 16 is connected to vertical bars 17, which in their upper ends are in contact with inclined bottom walls of the feed hopper. In this way the rubber walls of the feed hopper 15 will on each tilting of the vessel 5 receive a blow. In this way the banging of the bars 17 on the inclined, rubber bottom walls of the feed hopper ensures that the lime powder does not get stuck in the hopper. The arm 13 and the chain 12 are, of course, returned to their initial position by a spring that is (not shown) or by a counterweight.

When the water with lime powder added to it reaches the solution chamber 8, the lime will gradually start to dissolve. This is, however, no immediate process, but the larger undissolved lime particles will be trapped by the vertical baffles 10 extending from the bottom, whereas the water with dissolved lime and, of course, very small lime particles flows over these walls. The greater particles will gradually sink towards the bottom of the solution chamber. When the next tilting of the tilting vessel 5 occurs, the fresh water which is added will, due to the baffles 9 extending from the top of the solution chamber 8, force the water to stir the particles on, and close to the bottom. The particles are thus never allowed to deposit as sediment within the solution chamber.

Figure 2:
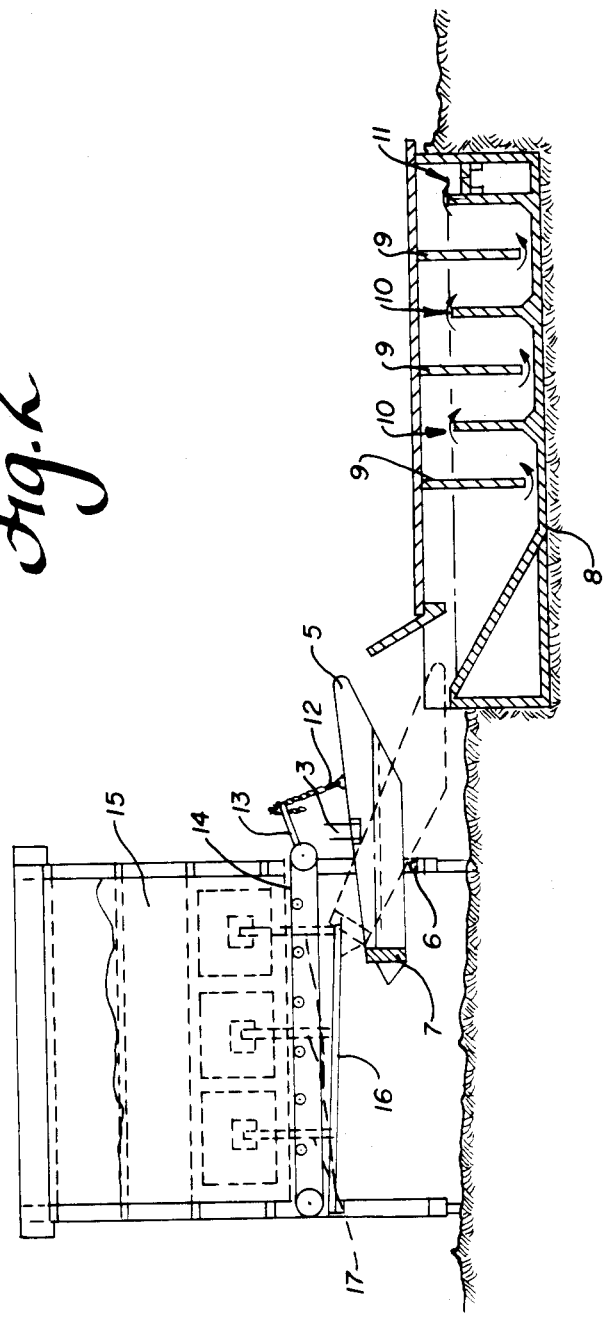
FIG. 2 is a side elevation view thereof, partially in longitudinal vertical cross-section.
Figure 3:
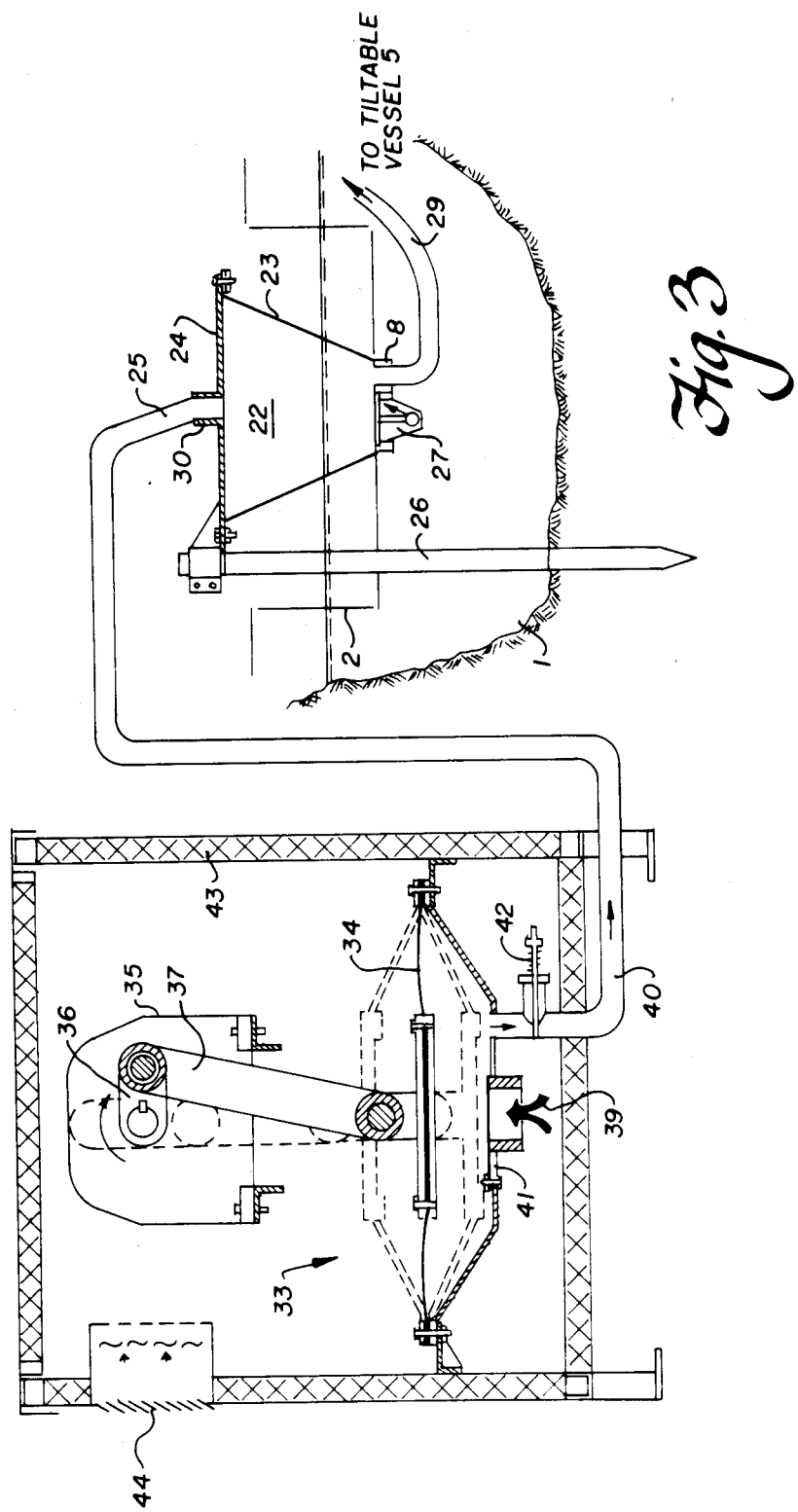
FIG. 3 is a diagrammatical vertical transverse cross-sectional view of a stream provided with a device for continuously adding lime to the water in proportion to water flow, according to a second embodiment of the present invention.

As is apparent from the above description, the invention will, in a very robust and simple manner provides the adding of lime to water in an amount proportional to the amount of water, with a minimum of servicing and manual work. It is to fill the hopper 15 only occasionally. The device can therefor be placed practically anywhere where a stream exists, provided, of course, that a sufficient difference between water levels is obtainable so that water can be led to and from the device. However, as is easily understood, no great height is necessary. When even a small height is not available, the additional devices of FIGS. 3 and 4 can be substituted for the chute 3. In FIG. 3 there is shown how a pump chamber 22 can be arranged in a ditch or a small stream. In the stream, a restriction baffle 1 is arranged to define the cross-section of the stream at the location of the pump chamber. The pump chamber is constituted by a conical bottom part 23 and an upper lid 24 provided with a connection 30. At the bottom of the frustoconical bottom part 23, a non-return valve 27 is arranged for constituting an inlet for the pump chamber. In its bottom, the pump chamber is further provided with an outlet 28 to which is coupled a hose 29. The other end of the hose 29 is situated above the tilting vessel (not shown in FIG. 3 or 4, but comparable to the tilting vessel 5 in FIGS. 1 and 2). The water level in the pump chamber 22 will correspond to that in the ditch. The connection 30 is via a hose 25 connected to a membrane compressor, e.g. the air pump 33. Furthermore, it should be mentioned that the pump chamber 22 is fastened to the ditch by means of a vertical post 26.

The compressor or air pump 33 is a membrane pump with a membrane 34 driven by an electrical engine 35 via a reduction gearing and a crank 36 mounted on the output shaft of the gear box. The gearing is such that the crank is given five revolutions per minute. The crank 36 drives the membrane via a push rod 37. Below the membrane, the compression space of the pump or compressor is arranged and it is essentially frustoconical. In the bottom of the frustoconical compression chamber an inlet 39 is arranged, the inlet being closed by a flap valve 41. In the bottom of the frustoconical chamber is further arranged an outlet 40 that is connected by means of the hose 25 to the pump chamber 22. A relief pressure safety value 42 is also incorporated in the outlet 40. The compressor is enclosed in a housing 43 with inlet means 44 for cooling air and a heating element 45 to prevent ice fouling of the operation during cold weather.

When the membrane 34 is pushed downwards, the air enclosed between the frustoconical compression chamber and the membrane is pressed out through the outlet 20 to the pumping chamber 22 and the water in the pumping chamber 22 is pressed out through the hose 29 to the tilting vessel. When the membrane 24 starts to move upwards the pressure in the pump chamber 22 is relieved and water can once again flow into the pump chamber until the next working stroke of the membrane, allowing the water level to adjust to that in the ditch. Since the membrane compressor at each stroke will empty the pump chamber 22, the amount of water delivered to the tilting vessel will be proportional to the level of the water in the ditch and thus to the water flow in the ditch. With the adding of the supplementary structure depicted in FIG. 3, the device is still very simple very sturdy and, requires very little service and enables one to add lime to very slow-flowing and thus level streams. The only further requirement is the provision of power from one source or another and, if one wishes to place the device at very distant locations, a small power plant can also be added.

The reliable functioning of the apparatus as well as its simplicity results in a very economic addition of lime to water under different conditions as compared to the conventional apparatus which normally require much manual work, as well as expensive machinery, with inferior use of the lime.

If the air at the air pump is heated, this heat will, to a certain extent, be transferred to a pump via the air and thus the device can also work at a few degrees below the freezing temperature of water.

The working volume of the air pump can, of course, be made greater than the volume of the pump chamber so that even when the pump chamber is essentially filled with water between the strokes, air is always blown out through the outlet from the pump chamber, giving a continuous stream of air through compressor pump and hoses. The flap valve in the compressor ensures that under no conditions can a sub-pressure exist in the air pump and therefore no additional water will be sucked into the pump chamber and it will always try to establish the same level inside as well as outside of the pump chamber.

What I claim is:

1. Apparatus for wetting and adding to a flowing stream of water in proportion to the level of water flowing in the stream, a succession of doses of an aqueous solution of a particulate, at least partially dissolvable solid material such as lime, said apparatus comprising:
a counterweighted vessel having an inlet opening and a pour spout;
means eccentrically suspending the vessel, so that when the vessel is empty and is being filled through the inlet opening, the vessel rests in a level condition in which water and material will accumulate in the vessel, but when a predetermined amount of water and material have accumulated to constitute a single dose, the vessel will temporarily tilt, empty the dose out through said pour spout, and reassume its level condition;

inlet means connecting the flowing stream with the inlet opening of the vessel for supplying the vessel with successive dosage-quantums of water from the stream at a rate which is proportional to the level of water flowing in the stream;

a hopper for particulate at least partially dissolvable solid material such as lime, said hopper having an inlet and an outlet;

conveyor means extending between said outlet of said hopper and said inlet opening of said vessel for supplying said particulate material to said vessel; and conveyor operating means operatively connected with said vessel for indexing said conveyor means forwards one step for each cycle of tilting and reassumption of level condition of said vessel, whereby one dosage quantum of particulate material from the hopper become mixed with each dosage quantum of water from the stream in the vessel prior to each tilting and emptying of the vessel; and outlet means for connecting the pour spout of the vessel, when tilted, with the flowing stream, for thereby successively adding to the stream the doses of the aqueous solution after each is made in the vessel.

2. The apparatus of claim 1, wherein:

said outlet means includes a trough having a plurality of baffles projecting transversally from two opposite direction into a flow path provided therethrough, for enhancing mixing and dissolving of particulate material and water therein.

3. The apparatus of claim 2, wherein:

some of said baffles project down into said flow path from above and others of said baffles project up into said flow path from below.

4. The apparatus of claim 1, wherein:

said inlet means connecting the flowing stream with the inlet opening of the vessel includes:

a chute having an inlet end arranged to be disposed in a stream, and a dam with a notched upper edge for providing an overflow notch of defined cross-section;

said inlet end of said chute being disposed in said overflow notch.

5. The apparatus of claim 1, wherein:

said inlet means connecting the flowing stream with the inlet opening of the vessel includes a pump having an inlet side and an outlet side, said pump being disposed to draw water from said stream at a rate which is proportional to the level of water flowing in the stream.

6. The apparatus of claim 5, wherein:

said pump is a diaphragm-type pump provided with a chamber having a backflow-preventing valve; said chamber being defined in part by a flexible diaphragm; and power-operated means for periodically temporirly flexing said diaphragm in a sense to temporarily volumetrically decrease said chamber, whereby water may fill said chamber from the flowing stream through the inlet said of the pump, and then, as the volume of the chamber is temporarily decreased, water is forced out of said chamber and out of said pump through said outlet side.

* * * * *